United States Patent Office 2,824,658
Patented Feb. 25, 1958

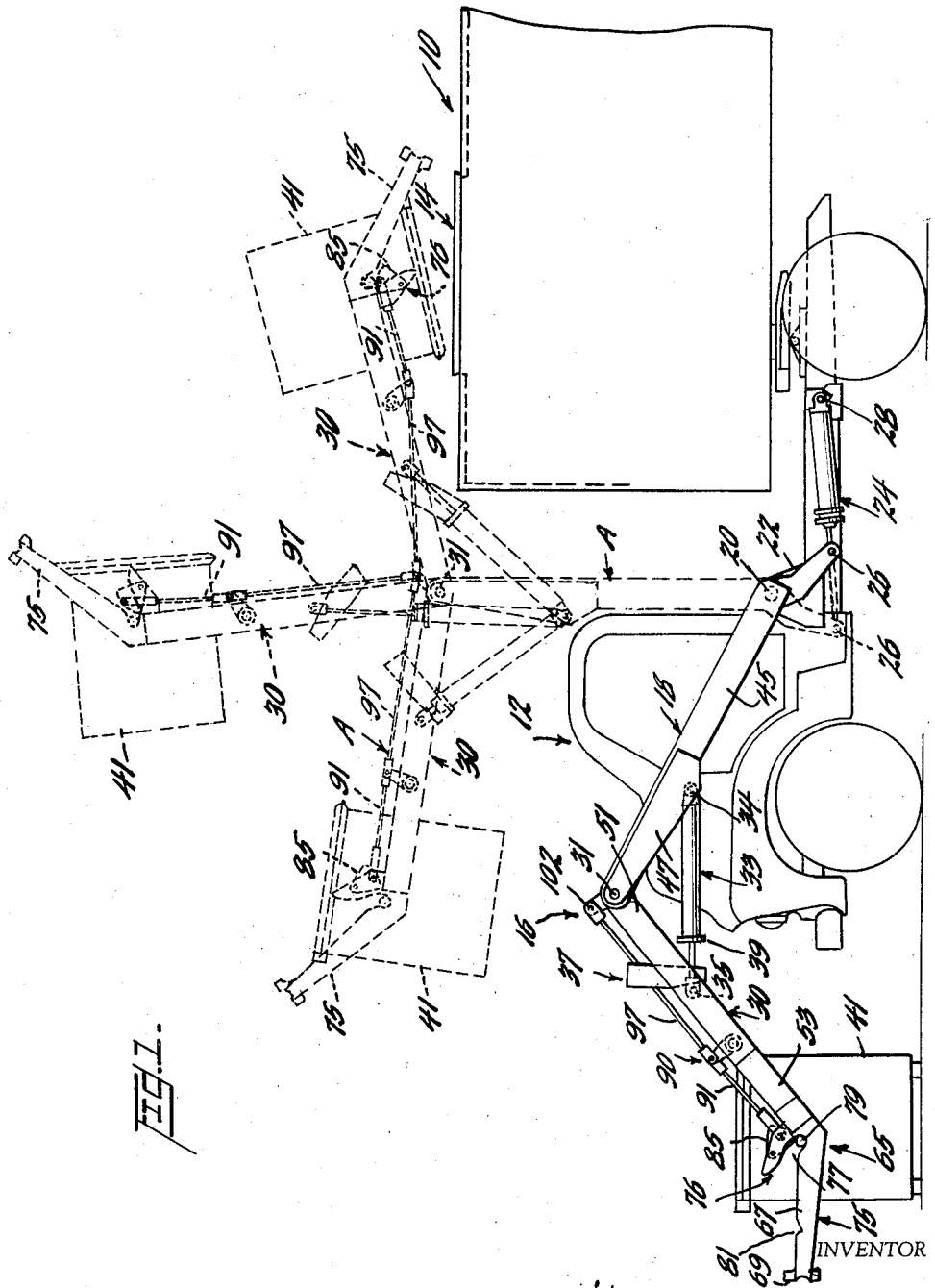

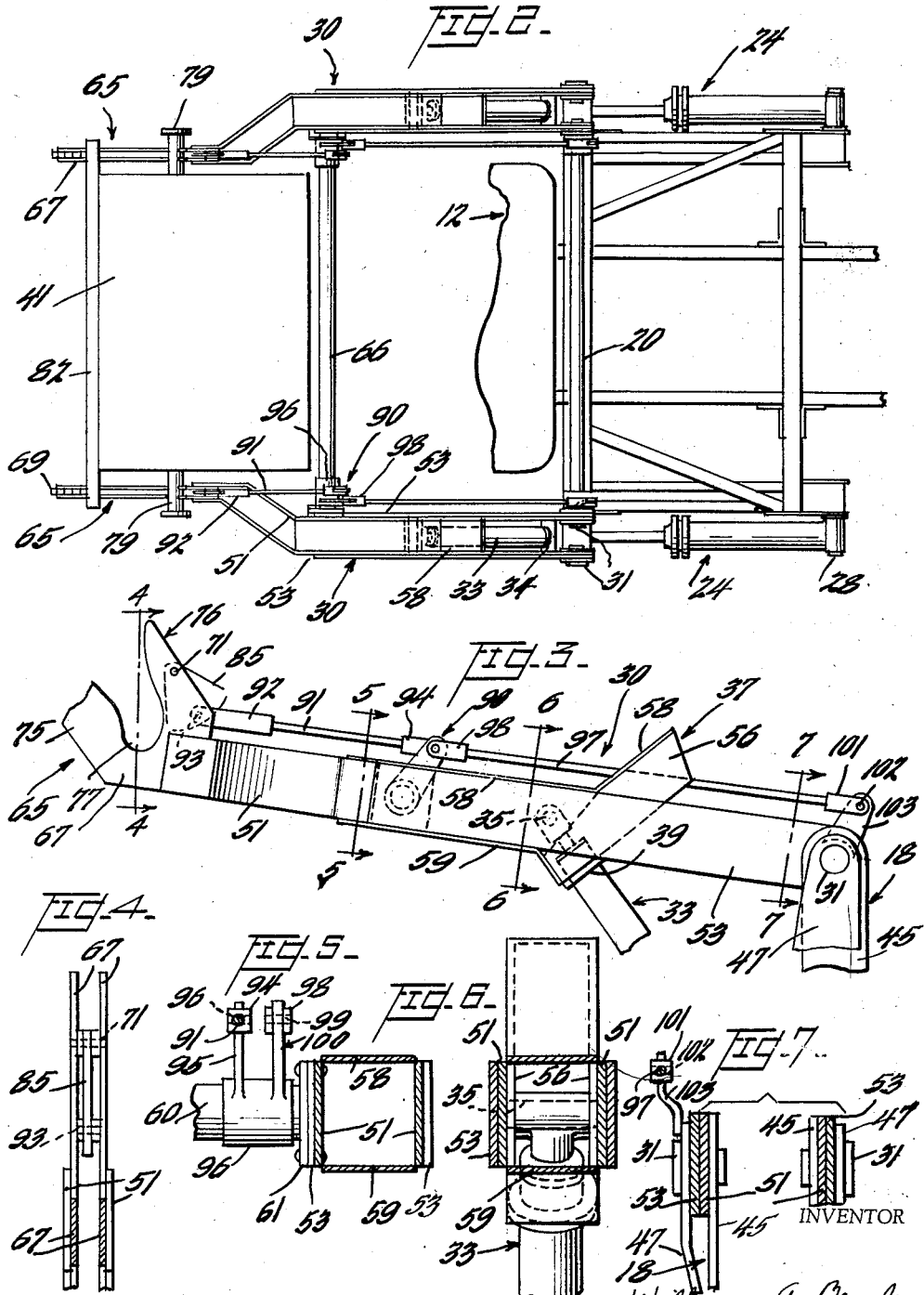

2,824,658
DETACHABLE CONTAINER AND LATCHING HOOK ARRANGEMENT FOR SELF-LOADING VEHICLES

William A. Beasley, Daisy, Tenn.

Application March 23, 1955, Serial No. 496,230

5 Claims. (Cl. 214—302)

This invention relates to a container and hook arrangement for use with a vehicle having self-loading arm units, and further to a mechanically actuated latch for automatically locking said container in said hook.

In the field of cargo transportation, it has been realized that a most efficient operation can be accomplished with a vehicle which carries its own loading mechanism. More particularly in the field of trash and other waste collecting, it has been found that a most efficient operation is one in which the collecting trucks are equipped with mechanism for engaging a trash bucket or container, dumping the contents of the bucket in the cargo body of the truck and releasing the bucket in its original position.

The detachable bucket and hook arrangement contemplated by this invention is particularly adapted for use in connection with vehicle loading mechanism which includes a pair of lifting arms pivotally mounted on opposite sides of the vehicle and a second arm pivotally attached to the free end of each of the lifting arms. Such a double-arm loading mechanism has been previously proposed in the patent of James E. Owen, No. 2,441,591, issued May 18, 1948, and includes means for rocking the lifting and second arms about their respective pivots so that the free ends of the second arms may be moved between a lowered position extending forwardly of the vehicle and a raised or dumping position in which they are overturned above the cargo body of the vehicle. According to the present invention, the containers or buckets are provided with trunnions extending from opposite sides thereof and a fork-like hook member is attached to the free end of each of said second arms so that the trunnions on the containers may be detachably received within the slots formed between the prongs of the hook members.

When such a fork-like hook member is used with the double arm loading mechanism previously described, the slot between the prongs of each fork opens generally forwardly and upwardly when the hook member is being raised in order to support a bucket during such raising movement. Since the second arms are overturned as they move into the dumping position, the hook members are also overturned so that the slots open generally downwardly when in said dumping position. Accordingly, some means are required for supporting the container within the hook members when in said dumping position.

One purpose of the present invention is to provide a novel hook arrangement for self-loading vehicles whereby a bucket may be detachably engaged and moved into dumping position without requiring any locking operation on the part of the vehicle operator. More specifically, a purpose of the invention is to provide hook members having a novel latch member and means for automatically operating said latch. A further specific purpose of the invention is to provide positively actuated means for operating the latch in response to movement of the hook members between the lowered and dumping positions.

According to the previously described arrangement, the slots of the hook members are automatically locked to hold said container trunnions when in said dumping position and are automatically unlocked when in said lowered position so that said container may be freely engaged and released. However, the previously described arrangement does not provide for overturning the container as it moves into dumping position because the trunnions are free to rotate within the hook slots. Accordingly, a further purpose of the present invention is to provide a novel container structure having abutment means which cooperate with the hook members to overturn the container as it moves into dumping position and yet permit the container to be returned to the ground right side up.

Other and further purposes, features and advantages will be apparent from the following description when read in connection with the accompanying drawings in which, Figure 1 is a side elevational view of a self-loading cargo vehicle equipped with a container and hook arrangement according to the invention, and showing the loading mechanism in various positions of operation;

Figure 2 is an enlarged top plan view of the loading mechanism in the dotted position marked A in Figure 1. In this figure the vehicle cab is shown in partial outline and the cargo body is omitted;

Figure 3 is an enlarged side elevational view of the second arm, latch mechanism, and the upper portion of the lifting arm in the dotted position marked A in Figure 1;

Figures 4, 5, 6 and 7 are detailed sectional views taken respectively on lines 4—4, 5—5, 6—6, and 7—7 of Figure 3.

Referring in more detail to the drawings, Figure 1 shows a vehicle having a cargo body 10 and a cab section 12. The cargo body may be entirely open at the top or may be provided with a partial opening extending transversely across the body 10, as indicated at 14. The vehicle is equipped with a double arm loading mechanism similar to the type disclosed in the patent to James E. Owen No. 2,441,591, issued May 18, 1948. The loading mechanism essentially comprises a pair of arm units 16 mounted on opposite sides of the vehicle. The arm units and operating means therefor are identical on opposite sides of the vehicle and therefore only one side is shown in Figure 1. The arm units each comprises a lifting arm 18 supported on a pivot shaft 20 carried adjacent its ends by bearing blocks 22 which are attached to the vehicle. Each arm 18 is operated by a double acting cylinder and piston unit 24 which is pivotally attached to the arm at 26 and pivotally attached to the vehicle at 28. Each arm unit 16 further comprises a second arm 30 pivotally connected at 31 to the lifting arm 18. Each arm 30 is operated by a single acting cylinder and piston unit 33 which is pivotally attached to the lifting arm 18 at the point 34 and to the second arm 30 at the point 35.

In order to limit the pivotal movement of arms 30 about arms 18, a channel-shaped stop member 37 may be welded across each arm 30 for engagement with a collar 39 on the cylinder portion of each unit 33. A conventional hydraulic pump and valve system, not shown, is provided for operating the cylinder units 24 and 33. One suitable pump and valve system is shown in the patent of James E. Owen, No. 2,441,591, issued May 18, 1948. As shown in Figure 1, the unit 24 moves lifting arms 18 between the lowered position shown in solid lines and the raised position shown in dotted lines, and the unit 33 moves the second arms 30 through the arc shown by the dotted line sequence in Figure 1. The rearmost position shown dotted in Figure 1 is considered to be the raised or dumping position in which the bucket or container 41 is located directly over opening 14 in the cargo body.

Referring now to the structural details of the arms 18 and 30, it will be seen each of the arms 18 comprises two spaced main plates 45 to the outside of which are secured additional plates 47, the outer ends of plates 47 being bent away from plates 45 to form slots 49, as shown in Figure 7. Each of the second arms 30 comprises a pair of spaced main plates 51 to the outsides of which are attached shorter reinforcing plates 53 as shown in cross-section in Figure 5. As shown best in Figures 3 and 6, the stop member 37 for each of the arms 30 comprises a pair of plates 56 welded across the inner sides of plates 51. A bent reinforcing plate 58 is welded across the upper edges of plates 56 and 51 and a similar reinforcing plate 59 is welded across the lower edges of these plates. As shown best in Figures 2, 3, and 7, the inner ends of plates 51 and 53 are received within the slots 49 formed on arms 18 and are there secured for pivotal movement by the pins 31. The two spaced arms 30 are connected together by means of a bar 60. As shown in Figure 5, each end of bar 60 carries a flange 61 which is riveted or otherwise secured to the adjacent arm 30. The piston end of the cylinder and piston unit 33 is journaled on the pin 35 carried by the plates 56.

According to the invention, a hook member 65 is rigidly secured to the free end of each of the second arms 30. As shown best in Figures 1, 2, 3 and 4, each of the hook members comprises a pair of parallel plates 67 which are held in spaced relation by means of separator and bucket maneuvering member 69 and by the pin 71. If desired, additional spacers could, of course, be used. The assembled hook members are welded between the free ends of the plates 51 of the second arms 30.

The hook members 65 will now be described as they appear in the lowered position shown solid in Figure 1. Each hook member has a generally fork-like shape and comprises a lower prong 75 and an upper prong 76 forming between them a slot 77 for receiving trunnions 79 which extend from opposite sides of container 41. The upper edges of the lower prongs 75 have a slot 81 which is adapted to receive an abutment member 82 extending beyond the sides of container 41. As disclosed in Figure 2, the abutment member is a unitary bar welded across the front of container 41, but separate abutment means for each side of the container could, of course, be substituted for member 82.

Referring to Figure 1, it will be noted that as the hook members 65 are in the dumping position shown dotted at the right of the figure, the slot opens generally downward and the container would thus be free to fall from the hook members unless closure means were provided for the slots. According to the present invention, closure means are provided in the form of a latch 85 associated with each of the hook members. As shown best in Figures 3 and 4, latch 85 is pivotally mounted on the upper prong 76. According to the preferred construction, the latch 85 is mounted between plates 67 on pin 71, and actuating means are provided for the latch in the form of the link means indicated generally at 90. The link means comprises a first rod 91 having an attachment 92, which attachment is slotted at one end to receive latch 85° and is pivotally secured to the latch by means of pin 93. The other end of rod 91 has an attachment 94 which is slotted to receive an arm 95 extending radially from a sleeve 96 journaled on the transverse rod 60 as shown in Figure 5. Rod 91 is pivotally attached to arm 95 by means of the pin 96. A second rod 97 has a fitting 98 at one end which is pivotally secured by means of pin 99 to a second arm 100 on sleeve 96. At the other end of the second arm 97 a fitting 101 is pivotally connected by means of pin 102 to an ear 103 which is welded or otherwise rigidly secured to the plate 47 on the lifting arm 18.

It will be noted that pivot pin 102 at the inner end of each link means 90 is offset from the pivot pin 31 for each of the arms 30. As a result of this offset arrangement, each link means 90 moves outwardly along its second arm 30 as the second arms are rotated clockwise around the lifting arms 18, as is apparent from Figures 1 and 3. Such outward movement of the link means causes the latches 85 to pivot about their pins 71 and close slots 77, so that the container trunnions 79 will be locked in the hook members 65. Conversely, when arms 30 are rotated counter-clockwise around arms 18, each link means 90 moves inwardly along its arms 30, thereby returning latches 85 to the open position so that trunnions 79 may be disengaged from the hook members.

The structure thus far described operates in the following manner. The vehicle is driven into a position directly in front of container 41, the arm units 16 are lowered, and the vehicle and arm units 16 are then maneuvered so that trunnions 79 of the container are positioned in slots 77 of the hook members, as shown solid in Figure 1. Next the lifting arms 18 are raised to the position shown dotted in Figure 1. During such movement, container 41 tends to remain vertical and therefore, in effect, container 41 tends to rotate counter-clockwise relative to hook member 75 until the ends of abutment member 82 are received within slots 81. Finally, the cylinder and piston units 33 are expanded to rotate arms 30 about their pivots 31 to the dumping or rearward position shown dotted toward the right of Figure 1. During this final movement the container 41 is caused to overturn by reason of the engagement of abutment member 82 in slots 81. Also during this movement of arms 30 around arms 18, the latch actuating means 90 cause the latches 85 to close slots 77 so that trunnions 79 will be locked within the slots when the hook members 65 are in the dumping position. After the contents of container 41 have been emptied into the cargo body 10, the container 41 is returned to the ground in the following manner. Arms 30 are rotated counter-clockwise around arms 18 until they are returned to the forward position marked A in Figure 1. As previously explained, such counter-clockwise movement of arms 30 causes link means 90 to rotate the latches 85 into open position. After arms 30 reach the forward positions marked A, the arms 18 are lowered until container 41 is returned to the ground. The vehicle is then backed away from container 41 and may be driven to another loaded container.

In order to facilitate an understanding of the invention, reference has been made to the embodiments thereof shown in the accompanying drawings and detailed descriptive language has been employed. It will nevertheless be understood that no limitation of the invention is thereby intended and that various changes and alterations are contemplated such as would ordinarily occur to one skilled in the art to which the invention relates.

Having thus described the invention, what is claimed as new and desired to be secured by Letters Patent is:

1. In combination with a self-loading cargo vehicle of the type having two spaced arm units pivotally supported on said vehicle for simultaneous rocking movement between a lowered position in which the free ends of said arm units extend beyond the plan outline of said vehicle and a dumping position in which the free ends of said units are positioned adjacent the top of the cargo body of said vehicle, the improvement comprising two hook members, one attached to the free end of each of said arm units, each said hook member having a slot therein, a container having trunnions extending from opposite sides thereof, each of said trunnions being slidably and rotatably received in one of said slots, said slots being open at one end whereby said trunnions are detachably received therein, and means for limiting rotary movement of said container relative to said hook members, said last named means comprising abutment means extending beyond said opposite sides of said container and engaged by said hook members when said arm units are moved toward said dumping position, each of said hook members being provided with a groove which receives said abutment means when said arm units are moved toward said dumping position, each of said grooves being positioned between the free end of its respective hook member and the closed end of said slot, and said grooves being arranged so that they open in a generally upward direction when said arm units are in said lowered position.

2. The combination claimed in claim 1 in which each of said hook members comprises two adjacent prongs forming said slot between them, one of said prongs being longer than the other, said groove in each hook member being formed in said longer prong between the free end of said longer prong and the free end of said shorter prong, and when said arm units are in said lowered position, each said longer prong is below the adjacent shorter prong and each said groove is in the upper edge of its respective longer prong.

3. In combination with a self-loading cargo vehicle of the type having support means and an elongated arm pivotally supported on said support means for rocking movement about said pivotal support and relative to said support, the improvement comprising a hook member attached to the free end of said arm, said hook member having a slot therein, said slot being open at one end, a movable latch swingable on said hook member for closing said slot, and rigid latch actuating means eccentrically to the rocking movement of said arm and the swinging movement of said latch respectively for operation by pivotal movement of said arm about said pivotal support.

4. In combination with a self-loading cargo vehicle of the type having an elongated arm pivotally supported on said vehicle for rocking movement about said pivotal support, the improvement comprising a hook member attached to the free end of said arm, said hook member having a slot therein, said slot being open at one end, a movable latch swingable on said hook member for closing said slot, and latch actuating means operated by pivotal movement of said arm about said pivotal support, said means for actuating said latch comprising link means, a pivot pin supported from said vehicle off-center of said pivotal support for said arm, the axis of said pivot pin being stationary relative to the axis of said pivotal support, and said link means having one end connected to said pivot pin and the other end in engagement with said latch.

5. A lifting arm arrangement adapted for use on a self-loading cargo vehicle comprising a first arm adapted adjacent one end for pivotal attachment to the vehicle, a second arm pivotally connected adjacent one end to the other end of said first arm, a hook member connected to the other end of said second arm and forming a slot which is open at one end, latch means for closing said slot, and latch actuating means operated by pivotal movement of said second arm about its connection to said first arm, said latch being pivotally connected to said hook member and said latch actuating means comprising link means engaging said latch and said first arm, one end of said link means being pivotally connected to said latch off center of the pivotal connection between said latch and said hook member, and the other end of said link means being pivotally connected to said first arm off center of the pivotal connection between said first and second arms.

References Cited in the file of this patent

UNITED STATES PATENTS

| | | |
|---|---|---|
| 2,441,591 | Owen | May 18, 1948 |
| 2,624,478 | Kaplan | Jan. 6, 1953 |
| 2,626,070 | Ezell et al. | Jan. 20, 1953 |
| 2,699,876 | Smith | Jan. 18, 1955 |
| 2,716,501 | Geiger | Aug. 30, 1955 |
| 2,716,502 | Wilson | Aug. 30, 1955 |